United States Patent
Chelala et al.

(10) Patent No.: US 12,330,318 B1
(45) Date of Patent: Jun. 17, 2025

(54) DYNAMIC REAL-TIME TRACKING AND ROBOTIC SYSTEMS

(71) Applicant: DIGITAL DENTAL DESIGN ROBOTICS, Waterloo (BE)

(72) Inventors: Pierre Chelala, Waterloo (BE); Sébastien Janssens, Brussels (BE)

(73) Assignee: DIGITAL DENTAL DESIGN ROBOTICS, Waterloo (BE)

( * ) Notice: Subject to any disclaimer, the term of this patent is extended or adjusted under 35 U.S.C. 154(b) by 0 days.

(21) Appl. No.: 18/977,028

(22) Filed: Dec. 11, 2024

(51) Int. Cl.
*B25J 19/02* (2006.01)
*B25J 9/16* (2006.01)

(52) U.S. Cl.
CPC .......... *B25J 9/1692* (2013.01); *B25J 19/022* (2013.01)

(58) Field of Classification Search
CPC ............................ B25J 9/1692; B25J 19/022
See application file for complete search history.

(56) References Cited

U.S. PATENT DOCUMENTS

| | | | |
|---|---|---|---|
| 9,318,308 B2 * | 4/2016 | Brown | H01J 49/065 |
| 11,753,681 B2 * | 9/2023 | Chiu | C12Q 1/686 |
| | | | 435/6.11 |
| 11,768,504 B2 * | 9/2023 | Ebrahimi Afrouzi | G06N 3/082 |
| | | | 701/25 |
| 11,864,727 B2 | 1/2024 | Ciriello et al. | |
| 12,235,659 B2 * | 2/2025 | Ebrahimi Afrouzi | |
| | | | A47L 11/4063 |
| 2004/0157188 A1 | 8/2004 | Luth et al. | |
| 2009/0148816 A1 | 6/2009 | Marshall et al. | |
| 2012/0143364 A1 | 6/2012 | Mcleod et al. | |
| 2013/0230827 A1 | 9/2013 | Kwon | |
| 2015/0132718 A1 | 5/2015 | Kerschensteiner et al. | |
| 2015/0215584 A1 * | 7/2015 | Tapia | H04N 7/183 |
| | | | 348/125 |
| 2018/0071063 A1 | 3/2018 | Watzke et al. | |
| 2018/0263726 A1 | 9/2018 | Fares et al. | |
| 2021/0369421 A1 | 12/2021 | Chelala | |
| 2023/0052634 A1 * | 2/2023 | Tomblin | B29C 65/8253 |
| 2023/0131624 A1 * | 4/2023 | Tomblin | B25J 15/04 |
| | | | 700/253 |
| 2023/0146701 A1 * | 5/2023 | Tomblin | B25J 9/1617 |
| | | | 700/245 |

(Continued)

FOREIGN PATENT DOCUMENTS

| | | |
|---|---|---|
| EP | 3 639 787 A1 | 4/2020 |
| WO | 2018007935 A1 | 1/2018 |

(Continued)

OTHER PUBLICATIONS

Jams et al., Characterization of a Miniaturized IR Depth Sensor With a Programmable Region-of-Interest That Enables Hazard Mapping Applications, 2020, IEEE, p. 5213-5220 (Year: 2020).*

(Continued)

*Primary Examiner* — McDieunel Marc
(74) *Attorney, Agent, or Firm* — CHRISTENSEN O'CONNOR JOHNSON KINDNESS PLLC

(57) ABSTRACT

A dynamic high precision tracking system is usable with a robotic system having a mobile robotic arm holding a tool for performing an operation on a body. The tracking system includes an asymmetric polyhedric target scanned by a laser device so as to determine a pose of the body based on a sensed laser profile induced by the target. The tracking system can be used for medical procedures.

16 Claims, 2 Drawing Sheets

(56) References Cited

U.S. PATENT DOCUMENTS

2024/0277424 A1    8/2024    Ciriello et al.

FOREIGN PATENT DOCUMENTS

WO        2018150336 A1    8/2018
WO        2018154485 A1    8/2018

OTHER PUBLICATIONS

Patel et al., Simulation of a virtual reality tracking system, 2011, IEEE, p. 1-6 (Year: 2011).*
Huang et al., Infrared Digital Holography, 2024, IEEE, p. 1-37 (Year: 2024).*
Hogue et al., An optical-inertial tracking system for fully-enclosed VR displays, 2004, IEEE, p. 1-8 (Year: 2004).*
Hwang, Jae Joon et al., "Factors Influencing Superimposition Error of 3D Cephalometric Landmarks by Plane Orientation Method Using 4 Reference Points: 4 Point Superimposition Error Regression Model," Nov. 2014, pp. 1-10, vol. 9, No. 11, PLOS ONE.

* cited by examiner

DYNAMIC REAL-TIME TRACKING AND ROBOTIC SYSTEMS

BACKGROUND

The disclosure relates to a tracking system, its manufacture method, a tracking method by use of the tracking system and a robotic system comprising the tracking system.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

In conventional dental practice, preparing a tooth for a prosthetic element involves manual, invasive machining performed directly in the patient's mouth. This process is highly dependent on the clinician's skill, leading to inconsistencies in quality, tolerances, and precision. The manual preparation is prone to variability, with no standardized method to ensure consistent outcomes, and errors in the preparation stage often propagate throughout the workflow. If the preparation is not adapted to suit the ideal anatomy and tolerances of restoration materials, function and esthetics or impression is imperfect, it results in inaccuracies at the laboratory stage, causing misfits, repeated trials, and adjustments, all of which depend on the technician's expertise. This traditional approach is not only inefficient but also highly time-consuming, requiring multiple patient visits and extensive chair time, so fewer patients can be treated, while unpredictable and average-quality outcomes are delivered.

To overcome these flaws, one of the inventors previously proposed in the documents EP3639787A1 and US 2021/0369421 A1 a breakthrough method for designing and placing a prosthetic element, as well as an assistance system to the dentist for the placement of the prosthetic element. The method is based on a computer implementation for designing the prosthetic element starting from an intra-oral three-dimensional representation and a (e.g. 3D or 2D) radiographic image of the dentition to be specifically superposed. A representation of a volumetric reduction of the tooth is derived algorithmically from these data, other technical parameters and/or an operator's input to define both a first computer file for manufacturing the prosthetic element and a second computer file comprising corresponding instructions to be read by a computer of a robot having a robotic arm attached to a dentist contra-angle and/or machining tool so that it may cause the robot to perform the volumetric reduction.

In order for this method to be successful, the robot has to be exactly situated in the space with respect to the tooth to be prepared. As it is practically impossible to avoid any patient's movement during the operative procedure, the above-mentioned documents proposed to use a guidance system having spatial reference frames attached to the dentition and to the robotic arm, and a detector with cameras to detect target symbols on the spatial reference frames configured for evaluating a distance to each of the latter, and connected to the computer to process the distances so that to inform the dentist or the robot of real-time compensatory movements to be performed by the robotic arm depending on patient's movements.

However, the precision of such a guidance system can be improved, in particular for high precision dental surgery requiring an error margin below 30 µm, because cameras and targets can be subject to small movements affecting the instructions running.

In a similar framework, the publication US 2024/277424 A1 disclosed a robotic arm with an end effector in communication with a central processing unit for performing dental surgery. The robotic arm is coupled to a passive positioning arm clamped to a tooth posterior to the tooth being worked on and arranged for tracking patient's motions. The passive positioning arm is passive with respect to reciprocal forces generated on the clamp as the patient moves and is connected with the central processing unit to transfer relevant positioning information. This technology however does not allow to limit the movements tracking error margin below 100 µm nor to fully compensate patient's dentition movements according six base axis, namely three translation axis and rotations around these axis.

An object of the disclosure is to provide a very safe and highly more precise and efficient tracking system that can be used for high precision robotic medical operations such as, but not limited to, a dental surgery as described above.

For this purpose, the disclosure provides a tracking system for tracking movements of a body, comprising:
- a spatial reference frame comprising an asymmetric polyhedric target arranged to be outwardly attached to the body;
- a laser device comprising a laser line emitter and a laser profile sensor arranged for receiving an emitted laser line reflection on the target;
- a computing unit connected to the laser profile sensor and configured (and/or programmed) for determining a pose of the body based on a sensed laser profile.

The tracking system according to the disclosure provides means for a high precision and efficient tracking of the movements of the body that can be used in high precision robotic medical operations or industrial applications as it will be discussed hereafter. A key for achieving this goal is the use of the laser device with a dedicated asymmetric polyhedric target. The emitted laser line is emitted by the laser line emitter so as to intersect the target and then to induce a laser profile from the reflection of the emitted laser line on the target. The laser profile is then sensed by the laser profile sensor, e.g. based on a time-of-flight measurement as it is known in the art. The laser profile can be seen by the sensor as one-dimensional geometrical object, typically broken line segments, in a plane, the continuous monitoring of which is used to determine efficiently, in particular quickly, sensed laser profile variations and to associate them with a motion of the target in the laser coordinate system. As the initial pose target is necessarily known by the computing unit in a tracking process, and as it may further be associated with an initial pose of the body to which the target is firmly or fixedly attached, the computing unit receiving sensed laser profile data by the connection can perform the monitoring and associate any detected motion of the target to an updated pose of the body.

The tracking system has the advantage to be very simple, but most of all very precise based on the asymmetric polyhedric target and the laser device used. According to the embodiment illustrated in FIGS. 1 and 2 hereafter introduced, which pertains to dental surgery, it has been calculated that the tracking system described in this disclosure achieves a dentition movement tracking error margin of approximately 30 µm across six base axes. This margin is 3.3 times lower than the best techniques known in the prior art. Moreover, the tracking system is non-invasive—it does not require attachment to the jaw or immobilization of the patient's head—ensuring patient comfort and minimizing stress. The tracking system can in particular be configured to track the body so as to induce real-time dynamic compensations of its movements for all six degrees of freedom simultaneously, including roll, pitch, and yaw.

The target is advantageously characterized as asymmetric polyhedric (then typically without any global symmetry) for several reasons. Firstly, such an asymmetric shape with sharp edges allows for an easy and quick detection of the laser profile variations when it moves. This is particularly useful to avoid the use of several laser devices emitting toward the target. Thanks to such a target, it can be needed and used only one of such laser devices for tracking the body. Secondly, the polyhedric feature for the target ensures to use a flat faces target, which is easy to manufacture and induce laser profiles corresponding to dots of broken line segments which are simpler to be processed by the computing unit than curved surfaces or other data. An easy and precise manufacture of the target is key for reaching a precision tracking so that providing a polyhedric shape contributes to this goal. Thirdly, a polyhedric target has faces over the whole width of the target leading to an easy processing of the sensed laser profile by the computing unit and avoiding conditional branching to determine the pose of the target based on the computer implemented method as described hereafter.

The asymmetric polyhedric shape of the target can be generated algorithmically and it may vary depending on the body to be tracked and tracking conditions. It will be generally desired to use a large size target to increase the impact of pose variations of the target on the sensed laser profile. However, the size of the target depends on operating technical constraints as it will be easily understood by the skilled person. For instance, high precision tracking for robotic dental surgery as mentioned according to the inventor's prior art, requires the spatial reference frame to be attached to the patient's dentition or to an operating zone around, so that the available place for the target is limited to some cubic centimeters order, e.g. inscribed in a cubic space of about 2 to 10 cm$^3$, which is not the case e.g. for members tracking application. Indeed, as the skilled person will understand, such high precision tracking requires the laser device to be close to the target, e.g. about 10 cm one from the other for the above-mentioned dental surgery, to capture as much as possible the emitted laser line reflection on the target, while other robotic means need also to be in the operating zone. This constraints the size of the target and its distance from the laser device.

The spatial reference frame is generally attached to the body. It can comprise a support part designed to be placed on the body and a coupler configured to demountably couple the target to the support part. Namely, the support part (splint) is fixed and/or attached and/or maintained on the body firmly so that a movement of the body induces the same on the target. An advantage of the coupler is that the target can be reused from one patient to the other in given operating conditions, while the support part can be designed to the body and then personalized to the patient's anatomy, so that providing a more stable and better placement of the support part on the body. The target then protrudes outward from the body while being fixed to the body thanks to the support part (which is attached inwardly to the body), which make the cooperation with the laser device much easier than with a target attached to the body without intermediate part. This embodiment does not exclude from the scope of the disclosure the use of a single piece spatial reference frame having the support part non-removably fixed to the target. This alternative may be preferable if the support part does not take advantage from being designed according to the body as the non-removable attachment may minimize tracking errors.

The target can have a geometry without undercut. This contributes to make its manufacturing simpler while avoiding a blind cavity for the laser device. The target geometry can be such that each sensed laser profile corresponds to a unique pose of the target with respect to the emitted laser line (considering the intersection of the laser line with the target). Such a target geometry allows a one-to-one correspondence between any sensed laser profile and a pose of the target, and then to avoid any error when determining the latter. Moreover, a laser profile variation can then be associated to a movement of the body according to one or more of the six base axis mentioned above. This embodiment may however be optional given the asymmetry of the target and the continuous monitoring of the sensed laser profile as those allows the computing unit to determine (target and) body poses variations. In particular, as the computing unit is able to perform this determination, the sensed laser profile should not be constant for continuously neighboring poses of the body.

According to an embodiment of the disclosure, the geometry of the target is beforehand designed by a computer implemented method forming fully part of the disclosure. The computer implemented design method for the geometry of target comprises the following steps:
  (i) setting a cubic base and a selection of points on the cubic base;
  (ii) defining a base geometry by modifying a position of the points according to geometric parameters of the geometry;
  (iii) setting a sample of possible poses of the base geometry;
  (iv) for each pose of the sample, evaluating a distance between:
  a sensed laser profile corresponding to the pose, and
  a sensed laser profile corresponding to an infinitesimal change of the pose;
  (v) iteratively modifying the position of the points so as to increase an average of the distances evaluated at the step (iv) and to converge to the geometry.

This method allows to determine an appropriate target depending on the laser device (laser line emitter frequency, laser profile resolution, etc.) and/or on the movements to be tracked (operating conditions, target size, laser device position with respect to the target, etc.). The points selected at step (i) on a cubic base are moved at step (ii) preferably based on geometric parameters related to these technical constraints, for instance on an edge or on a face of the cubic base and/or along a specific direction. The resulting base geometry can be defined from a random generation, in particular a random selection and position modification of the points. The sample of possible poses can be set at step (iii) by the Latin hypercube sampling method to generate a spread sample of poses. The distance evaluated at step (iv) can be defined depending an area computation between the sensed laser profiles. The infinitesimal changes to consider at step (iv) can be chosen as one or a few similar pose variations for each of pose of the sample (e.g. an infinitesimal translation according to a base axis, an infinitesimal rotation about another base axis). These may also depend on the laser device and on the movements to be tracked.

Finally, step (v) aims at maximizing a global distance between poses of a geometry and infinitesimal changes of these poses, where the global distance is evaluated at the sensed laser profiles level. Therefore, the designed geometry allows to highlight efficiently change of target pose for small laser profile variations which increase the precision of an underlying tracking system according to the present disclosure. The term "average" at step (v) has a generic meaning as a central or representative value of distances. Step (v) can be implemented by a Sequential Least-Squares Quadratic Programming from a random guess as solvers with a corresponding objective function at the ith iteration being set as $f_i$ and a stopping condition $|f_{i+1}-f_i|<10^{-x}|f_i|$, x being for instance 7, 8, 9 or 10. This programming was tested as the most efficient with this respect but other nonlinear optimization technics may also be used.

An embodiment of the converging optimization of step (v) is given by determining points of the geometry for minimizing the sum of $(\varepsilon+A_{p,\Delta})^{-1}$ over the poses p of the sample and over the infinitesimal changes $\Delta$, wherein $A_{p,\Delta}$ is the area between the laser profile for p and for p+$\Delta$ and wherein $\varepsilon$ is a positive constant. The term inversion in the above formula amplifies the penalty of having poses with similarly laser profiled neighbors, which is an undesired result, while the constant & determined how harsh that penalty is.

According to an embodiment of the tracking system, the target is manufactured according to a method forming part of the disclosure. This target manufacture method comprises a running of the computer implemented design method for designing the geometry of the target and a manufacture of the target so as to reproduce the geometry obtained at step (v). The manufacture of the target can be performed by machining on a raw material. The machining can be implemented by a milling machine configured to read a computer file comprising machining instructions corresponding to the designed geometry so that the milling machine executes the above-mentioned instructions. The machining can be a micro-machining so that the designed geometry is reproduced on the raw material with a margin error below 20 μm. The raw material can be non-metallic to avoid undesired laser optical effect and may consist in or comprise composite, resin, ceramic, and/or similar material.

The disclosure further proposes a manufacture method of the tracking system according to the disclosure comprising the above manufacture method of the target. The laser device and a computing unit can be provided according to the art. The computing unit is subsequently connected to the laser profile sensor and programmed so as to provide a tracking system according to the disclosure.

The programming of the computing unit can be so that the latter is configured to execute a computer implemented method for determining a pose of the body comprising the following steps:
(a) setting a pose guess of the target in a laser coordinate system and geometric parameters for faces of the target;
(b) assigning each point of the sensed laser profile to one of the faces of the target based on the pose guess;
(c) for each of the faces of the target, running a linear regression on points of the laser profile assigned to the face;
(d) iteratively modifying the faces so as to decrease the difference between the faces geometric parameters of the linear regressions run at the step (c) and the faces geometric parameters of possible poses of the target, and to converge to a pose of the target;
(e) determining the pose of the body based on the pose of the target.

The computer implemented method for determining a pose of the body is full part of the present disclosure and allows to determine both efficiently and precisely a pose of the (target and) body based on the sensed laser profile. The pose guess can be set as a calibrated rest pose of the target, typically at the tracking beginning, or a preceding known pose of the target according to a frequency of the laser line emitter if any. In particular, the last known pose of the target is then used as an estimate of the current pose of the target. This estimate is good as the laser frequency (and the computing frequency) are typically higher than 100 Hz, e.g. of about 300 Hz (accordingly to performance evolution of lasers). Indeed, in view of these frequencies, the target does not move significantly between two target pose determinations so that the last known pose is a good pose guess for the current pose. In some embodiments, the laser device allows to determine 250 poses of target per second, so that those can be communicated to a control unit of a robot for real-time compensation of its movements as introduced hereafter.

The geometrical parameters set at step (a) are for instance the slope and the face centers, providing then a two parameters per target face converging optimization to solve at step (d). The above method is in particular more efficient than a direct point by point laser profile optimization without pose guess which would have involved much more parameters to compute with. Thanks to a limited choice of geometric parameters and the use of the pose guess, the target pose can be determined under 1/10 ms, which contributes to the high efficiency and precision of the overall disclosure. As for step (v) precedingly, the step (d) can be implemented by a Sequential Least-Squares Quadratic Programming or several other known nonlinear optimization technics with a similar stopping condition as for step (v). Finally, step (e) may simply rely on the known stable relative position of the target and the body. The pose of the body is in general determined by the computing unit of the tracking system in a laser coordinate system.

Great advantage is taken from the above tracking system and method according to the disclosure when incorporated in a robotic system for performing an operation on a body. More specifically, the disclosure proposes a such robotic system comprising:
  a tracking system according to the disclosure for tracking movements of the body;
  a mobile robotic arm mounted on a supporting base and comprising an end to which is fixed a tool adapted to the operation;
  a control unit connected to the robotic arm and to the computing unit of the tracking system, and configured to:
  read a computer file comprising instructions associated to body representation data for performing the operation on the body by means of the tool;
  control movements of the robotic arm for running the instructions on basis of pose calibration data of the tool and the pose of the body (and/or target) determined by the computing unit.

The advantages and embodiments of the tracking system according to this disclosure apply mutatis mutandis (and is then fully applicable) to this robotic system, significantly enhancing its capabilities. Specifically, the integration of an efficient and high-precision tracking system enables the robotic system to perform operations with greater accuracy and effectiveness. This is particularly beneficial in the field of dental care, where it addresses limitations found in the above-mentioned prior art. In particular, the control of the movements of the robotic arm by the control unit based on the body pose received from the computing unit allows to compensate with a very high precision and efficiency the movements of the body, e.g. in a coordinate system of the robotic arm. The body pose can be filtered beforehand to limit the pose dynamic, e.g. by a Kalman filter. In some embodiments, the robotic arm has several bearings allowing for (partial) translation and rotation according to base axis as described above. The robotic arm may have seven articulated segments, six of which (with their bearings) allowing for moves according to the above-mentioned six base axis related to the body tracking. The seventh segment can be arranged to allow a modifications of the respective distance between the body and the robotic arm with the tool by a forward and/or backward movement e.g. of an amplitude of about 20 cm. This is for instance useful for modifying the initial robotic system position with respect to a patient chair and/or shape.

The control unit controls generally the robotic arm with the tool so that it can implement and control the whole operation without the need for any human assistance. An operator, however, may be assigned to the robotic system in order to monitor the good execution of the operation and/or to stop the robotic system in case of emergency. Such a stop can be implemented for instance by pushing on a button or a pedal on the robotic system to shut down to its power supply. The tracking system significantly enhances the performance of Robotic Assisted Surgery (RAS), transforming the robot from merely a clinician's tool positioner currently in use into a dynamic and automated tool. By adapting to patient movements in real time, it improves the robotic system's (and/or robot/cobot's) efficiency and effectiveness, eliminating constraints imposed by patient motion during operations while maintaining, local anesthesia, precision and therapeutic integrity. The robotic system may notably accommodate local anesthesia, streamlining the operative setup and allowing faster patient recovery compared to general anesthesia.

Unlike static, non-active RAS systems, which are limited to precise tool positioning for manual surgeon-driven operations (e.g., using a joystick for robotic arm control in digestive, ophthalmic, or hair transplantation procedures), this disclosure introduces "Dynamic Real-Time Tracking and Robotic Systems". The robotic system actively compensates for six base axis patient body motions, enabling e.g. fully automated surgical operations without reliance on continuous manual input. This represents a transformative shift from passive assistance to active, real-time autonomous operation, where the robotic system is directly performing a planned procedure with dynamic adaptability.

The disclosure allow to reduce dependency on human stress, fatigue, or advanced skill levels of a surgeon for performing a medical operation. Instead, it leverages cobot automation to execute digitally pre-planned procedures. The surgeon's role shifts from active manipulation to supervision, with hands-free control for adjusting, slowing, and/or halting the operation if discrepancies or emergencies arise. Unlike prior systems requiring constant manual joystick input, this solution enhances the surgeon's efficiency by automating complex, repetitive tasks while keeping them in control as needed. For complex procedures requiring the precision and coordination of four hands (e.g., in orthopedic, neurosurgery, or ENT surgeries), the robotic system can be configured to incorporate single or dual tracking according to the present disclosure with dual cobots, mimicking the coordinated efforts of both the surgeon and an assistant. This ensures seamless execution of intricate operations.

In the framework of this document, the term "body" refers to an object having a mass, preferably to a part of a human body, such a member, an organ, a dentition, etc. The term "operation" refers to an act or process executed on the body, preferably it is a medical operation, such as medical surgery. The robotic system is adaptable to various medical disciplines by integrating specific surgical instruments, motors, and holders tailored to the respective field. For example, it can handle orthopedic drills, ENT instruments, or delicate microsurgical pincers, providing versatility across domains like orthopedics, ENT, general surgery, and beyond. The scope of the disclosure is furthermore not limited to medicine; the tracking and robotic systems can also apply to industrial process, such as the manufacture or the reparation of mobile mechanical elements with high precision, the "body" being therefore such a mechanical element in this application. The target is "arranged to be outwardly attached to the body" means that the target is arranged to be attached to the body (as part of the spatial reference frame) outwardly to the body.

According to an embodiment of the disclosure motivated by the prior art and disclosed in the detailed description, the body refers to one or more teeth or to a dentition of a (human) patient, while the operation refers to a dental operation which can be associated with a wide class of dental care, e.g. direct or indirect dentistry, dental imagery, restorative and/or cosmetic dentistry, or dental implantology. In this framework, the tool can be a machining tool for machining (tooth cutting) at least one tooth or at least one implant drilling. For the case of an operation comprising the tooth preparation prior to the dental restoration of the tooth by the placement of a prosthetic element on the machined tooth or on the implant placed, the computer file comprises machining instructions e.g. under the form of a CAM file, and can be generated by the method according to claim 5 of EP3639787A1 or equivalently by claim 10 of US 2021/0369421 A1, which are incorporated by reference herein, as well as their corresponding advantages and embodiments. Thanks to the latter and to the high precision and efficient tracking system, the robotic system of the disclosure allows to take into account the overall dentition and the hard and soft tissues of a patient, e.g. through 3D Intraoral Scanner (IOS) and 2D radiographic image or 3D CT Scans, the machining of the tooth thus being perfectly adapted to the needs of the patient and to a prosthetic element previously designed. This teaching may obviously similarly apply to various applications beyond the above dental restoration in the scope of the disclosure when the operation instructions can be prepared by computer implemented and/or operator supervised method.

In the framework of this document, the term "pose" refers typically to a position and an orientation. "Pose" may correspond to an exact situation in the space according to six base axis corresponding to the base translations (X, Y, Z) and rotations (roll, pitch, yaw) in a coordinate system, generally in the laser coordinate system when considering the tracking system. The skilled person will however recognize that a body pose data in the laser coordinate system is equivalent to the body pose data in the robotic arm coordinate system, and that the coordinate change can be expressed based on pose calibration data as an initial relative position and orientation between the emitted laser line and the robotic arm or the tool can be determined thereof. Considering such a "pose" and the advantageous tracking system according to the disclosure, the robotic system allows then to compensate dynamically linear and rotational movements of the body during the operation (simultaneously in less than 15 ms) ensuring then a great precision and adaptability notably in a non-invasive setup.

This is a major advantage in comparison to prior art having a dentition or jaw attachment coupled to the robotic arm which allows to compensate limited movements during a dental operation according to only three to four of the base axis. This limitation can lead to alignment errors, imprecise cuts, and increased risk of collateral damage to adjacent oral structures. By addressing these challenges, the new system ensures superior precision and safety, even in dynamic surgical conditions. In particular, with respect to such prior art, the tracking system according to the disclosure provides full real-time compensation for body movements, ensuring accurate robotic arm and tool alignment with the tooth. This avoids complications from angular misalignments, such as pitch and yaw, which can cause imprecise cuts or drills and increase the risk of collateral damage to adjacent oral structures. This system further minimizes the risk of undesired machining, such as accidental damage to adjacent teeth or gingiva, while providing highly safe and predictable dynamic compensation for body movements, independent of any unstable fixation.

In the framework of the present document, the terms "computing unit" and "control unit" refers generically to computer means, i.e. to a computer and/or a processor of a computer. The term "computer" is used generically as to referring to a usual computer, a computer network and/or any other programmable (e.g. smartphone, tablet, FPGA, etc.) or programmed (e.g. an integrated circuit, etc.) apparatus. In particular, the term "computer" cannot be interpreted restrictively. The terms "computer-implemented" referring to a process or a method is used to specify that this process or method involves the use of a computer, one or more features of the process or the method being realized wholly or partly by means of a computer and/or a computer program executed by a computer. A configuration of computer means to perform a task generally underlies a programming of the latter to this effect and a related computer program (product).

A "connection" between the computing unit and the control unit and/or with the laser device or the robotic arm underlies generally the ability to transfer data between these. For instance, the control unit being connected to the robotic arm and to the computing unit of the tracking system, is configured to receive the body (and/or target) pose from the computing unit as well as to send movements control data to the robotic arm for running the instructions.

In the framework of this document, the use of the verb "comprise" or variants, does not exclude the presence of other elements than those mentioned. The use in this document of the terms "a", "an" or "the", to introduce an element does not exclude the presence of several of these elements. In this document, the terms "first", "second" and the like are used for distinguishing similar elements without inducing sequential or chronological order, unless otherwise indicated. In this document, the steps computer-implemented method can be executed in their presentation and/or numbering order.

The pose calibration data can be determined based on emitted laser line reflections on the tool received by the laser profile sensor and processed by the computing unit. The emitted laser line reflection is for instance sensed when the tool moves due to movements of the robotic arm according to six base axis known in the robotic arm coordinate system, and so that a pose calibration data computation can be performed. This easily allows to relate the tool pose both in the laser and the robotic arm coordinate systems, and/or to set a base pose for the tool with respect to the target from which is movements of the robotic arm can be controlled for running the instructions.

Alternatively or in combination to this, the pose calibration data can be determined based on comparison data between the body representation data and physical contact data between the tool and the body. This allows to increase the precision of the pose calibration data as the body representation data on which are based the instructions are directly related to a real pose of the body (when contacting the tool) in the coordinate system of the robotic arm. It can be set a correspondence with the laser coordinate system by processing the sensed laser profile with the computing unit during this step and by comparing expected body pose with the physical contact data.

According to an embodiment of the present disclosure, the tool is removably fixed to the end of the robotic arm by a pneumatic gripper operable manually and/or by the control unit, the pneumatic gripper being then electromechanically coupled to the control unit. This pneumatic gripper further increases the robotic system security and precision during the operation.

Indeed, firstly, the pneumatic gripper provides a steadier and stronger connection between the robotic arm end and tool than usual mechanical fixation means such as screws, and further allows to exert a high force e.g. of about 250 N to maintain highly firmly and fixedly the tool. Therefore, the movements of the robotic arm are transmitted highly faithfully to the tool without error, making very safe and precise operation by the robotic system based on the instructions and on the body-pose determined by the tracking system according to the disclosure. Secondly, in case of emergency (e.g. a patient medical problem for a body being part of the patient) and/or a robotic system failure, the pneumatic gripper can be switched off so as to release the tool quickly and efficiently from the end of the robotic arm. This can be done manually and/or by the control unit when required by an operator monitoring the operation, e.g. via a corresponding button on the control unit, or in an automatic way by the control unit programmed at this end, e.g. when a failure is detected, such as an impossibility to apply the instructions, a lack of power supply, a lack or insufficiency of connection between the control unit and the tracking system and/or the robotic arm, and so on. When the tool is released and/or disconnected from the robotic arm by disabling the pneumatic gripper, the operation stops immediately and most of all the tool is very quickly and easily removable from the body and/or operating area, notably much more than other mechanical fixation means, so that the operating security is increased.

According to an embodiment of the present disclosure, the tool is endowed with a force and/or pressure sensor connected to the control unit, the latter being configured to control the tool on basis of force and/or pressure data received from the force and/or pressure sensor. The tool, which may basically be controlled by the control unit based on the instructions reading and the pose of the body, is then further controlled by this additional force and/or pressure data. Such force and/or pressure data can be taken into account when implementing the instructions which increases the robotic system precision and the security in performing the operation.

Indeed, firstly, the control unit may control the tool so that force and/or pressure data to remain below an upper threshold or in an interval of values, for ensuring an efficient and safe execution of the instructions. In fact, an excessive force or pressure exerted on the body by the tool when operating can be an indicator of a tool misplacement with respect to the instructions or of a failure of the robotic system. Secondly, this embodiment also makes possible to integrate force and/or pressure information to the read instructions to be compared to the force and/or pressure data sensed by the control unit so as to monitor their correspondence. This ensures safer and more precise operations, particularly in operations where speed, force and/or pressure are critical, such as using a machining tool in dental implantology or tooth cutting. For instance, during high-speed cutting that transitions from enamel (very hard) to dentin (much softer), the system minimizes the risk of damage caused by overheating the tooth which could kill the nerves.

The force and/or pressure sensor may have a sensitivity of 1 gram of pressure. This advantageously allows the robotic system to palpate and/or to identify, with a tool, delicate structures like intestinal membranes or any sensitive tissues (e.g., nerves, blood vessels, or hard/soft tissues) depending on the body and on the medical operation to be performed on it.

The two preceding embodiments can be combined. Further, the pneumatic gripper can be operated by the control unit on the basis of the force and/or pressure data. The control unit can be configured to stop the tool and/or to release the tool from the end of the robotic arm (e.g. by switch off of the pneumatic gripper) if the force and/or pressure data exceed an upper threshold. The pneumatic gripper therefore acts as a safety breaker with respect to the force and pressure data sensed. This is a practical and safe realization of the operability of the pneumatic gripper by the control unit taking full advantages of the two preceding embodiments.

The force and/or pressure sensor may then play a safety and a control role in the instructions execution as mentioned above. Advantageously, it can also facilitate the robotic system calibration when physical contact data between the tool and the body are used to determine the pose calibration data. Indeed, in this case, the physical contact data may correspond to poses of the tool in a coordinate system of the robotic arm when force and/or pressure data reach a lower threshold and/or an expected threshold value. The poses of the tool may correspond to positions along a reference curve on the body, such as equatorial line of a tooth. This calibration with the tool is highly innovative and further avoid potential errors from the body representation data (e.g. from an IOS dental image) matching with target splint positioning on the body, through the (very sensitive, e.g. 1 g sensitive) force and/or pressure sensor and a corresponding palpation on the body on several points so as to adjust precisely the robotic system with this respect.

According to a generic embodiment, the robotic system (and/or robot/cobot's) supporting base comprises a column mounted on an extended ground support platform. The ground support platform can be fixed, or mobile with ground fixation means. In the latter case, the supporting base is for instance a Cart. Both of the column and the ground support platform may be (twice or five times or ten times) more massive than the robotic arm, in order for the gravity center of the robotic arm be the lower and the more stable as possible. The skilled person will understand that the robotic system kinematics is accordingly studied to ensure stability of the robotic system (and/or robot/cobot). This contributes to the avoidance of undesired vibrations of the robotic arm overhanging the support base during the operation and then to the robotic system high precision.

According to an embodiment of the robotic system, it includes an additional tracking system according to the disclosure for tracking movements of the robotic arm, the spatial reference frame of which being attached to the tool. The control unit is then connected to the computing unit of the additional tracking system and configured to control the robotic arm based on a real-time comparison of an expected pose of the tool derived from the (virtual planned and preferably CAM) instructions with a pose of the tool determined by the computing unit of the additional tracking system.

This embodiment further increases the safety and the precision of the robotic system, the additional tracking system acting as a safety tracking system of the tool. The control unit can then either modify slightly the robotic arm pose to compensate minor inconsistencies in the real-time comparison, or stop the tool e.g. waiting for an operator assistance or assessing the robotic arm movements with respect to the instructions and the additional tracking system. Alternatively, or in combination, the robotic system can comprise an interface to communicate the real-time comparison to an operator, and/or alert the operator of a deviation between the compared poses above a margin error threshold. The operator can then supervise the operation and decide if the robotic system has to be stopped. For instance, real-time visual safety controls are displayed on a screen as part of the interface for enhanced monitoring. More generally, such an addition tracking system allows the robotic system to act as an assistance to an operator also controlling the operation and/or the robotic arm and/or the tool as described in the prior art documents EP3639787A1 and US 2021/0369421 A1, the content of which is incorporated by reference herein. This additional tracking system could also be an extra safety backup to all other safety components as a stopping pedal, the pneumatic gripper, the force and/or pressure sensor, the target, etc., that are not known in the prior art.

When the robotic system comprises a pneumatic gripper as mentioned above, the latter can be operable by the control unit on the basis of the real-time comparison. The control unit is then further configured to stop the tool and/or to release the tool from the end of the robotic arm if the pose of the tool and the expected pose of the tool does not match. This makes the robotic system more safe, efficient and precise in implementing the operation while taking full advantage of the pneumatic gripper and the additional tracking system.

As it will be understood by the skilled person, the disclosure provides key advantages across various medical fields for performing medical operations, among which:
improved outcomes: provides better, predictable, and consistent quality results, applicable across medical disciplines;
minimally invasive and ultra-precise: reduces invasiveness while ensuring sub-millimeter precision;
efficiency and scalability: streamlines workflows, improves repeatability, and enhances scalability for hospitals and clinics;
faster recovery: minimizes trauma to the patient, accelerating recovery times.

The disclosed subject matter is further introduced in the claims. As it will be understood by a skilled person from the disclosure of the disclosure, the dependency of the claims can be considered in a broader manner so that any one of the possible combinations of the claims—as far as they are technically possible and understood by the person skilled in the art, in particular in view of the present disclosure—are part of the present application.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

Figure 1:
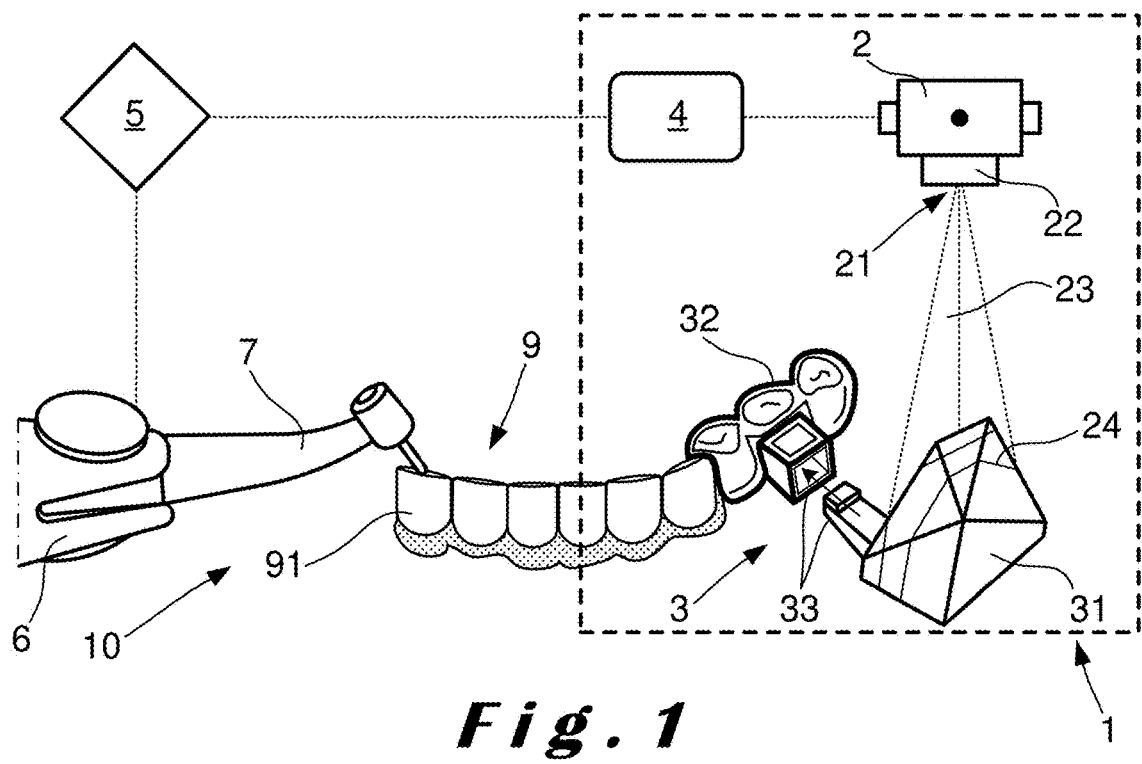
FIG. 1 illustrates a robotic system for performing a dental operation according to an embodiment of the disclosure.

The drawings are typically not scaled. Similar elements are generally assigned by similar references. In the framework of this document, identical or analogous elements may have the same references. Moreover, the presence of reference in the drawings cannot be considered to be limiting, comprising when these references are indicated in the claims.

DETAILED DESCRIPTION

This part of this document presents a description of embodiments of the disclosure with references to the drawings. The disclosure is however not limited by these references. The FIGS. 1 to 5 are only schematic and not limiting. In the present description with respect to FIGS. 1, 2 and 5, the body considered is a dentition and/or at least some teeth of a patient, the operation is a preparation of at least one tooth of this dentition for a dental care, e.g. a dental restoration, and the tool is a machining tool able to machine the tooth and could be at least one implant drilling operation. The term "machining" and its derivates are used equivalently to the terms "milling", (bone) "drilling" (for implant) and tooth "cutting" in this framework all along the present document. As above-mentioned in the disclosure of the disclosure, the latter is not limited in any way to these body, operation and tool.

The embodiment of the disclosure shown at FIG. 1 corresponds to a robotic system 10 for performing a dental preparation on a body 9 being all or a part of a dentition of a patient. The dental preparation is performed on at least a tooth 91 of the body 9, while a spatial reference frame 3 of a tracking system 1 for tracking movements of the body 9 is attached to at least another tooth of the body 9. The spatial reference frame 3 comprises an asymmetric polyhedric target 31 laying outwardly from the body 9. The tracking system 1 further comprises a fixed laser device 2. The latter can be maintained on a rigid vertical potence with articulated arms for better positioning of the laser device towards the patient's oral sphere. It comprises a laser line emitter 21 for emitting a laser line 23 toward the target 31, so as to intersect the target 31 along a reflection line 24. In practice, the term "laser line" refers to sections of a conic laser beam emitted by the laser line emitter 21 as it can be seen from FIG. 1.

Figure 4:
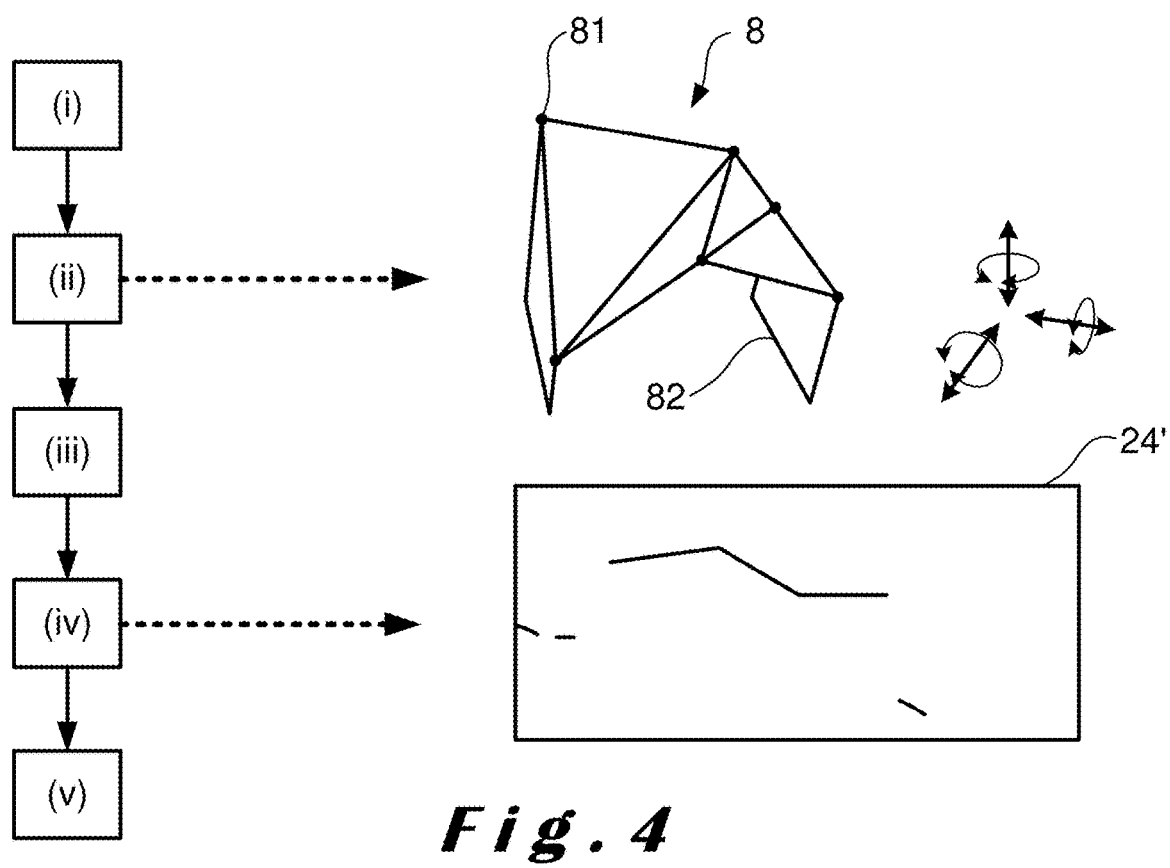
FIG. 4 illustrates a diagrammatic flow chart of a manufacture method of a tracking system according to an embodiment of the disclosure.

Emitted laser line reflections are received by a laser profile sensor 22 of the laser device 2, so that to defined a sensed laser profile 24', an example of which is shown on FIG. 4. A computing unit 4 of the tracking system 1 is also connected to the laser profile sensor 22 (or more generally to the laser device 2), so that to receive and process the sensed laser profiles 24', and to determine precisely and efficiently corresponding poses of the body 9 and/or of the target 31 with a high reactivity (e.g. of less 10 ms) and frequency (e.g. of about 100 to 300 Hz) as explained in the disclosure of the disclosure. To this end, the target 31 can have a geometry so that each of the sensed laser profiles 24' corresponds to a unique pose of the target 31 with respect to the emitted laser line 23.

The computing unit 4 of the tracking system is connected to a control unit 5 of the robotic system 10, so that to receive poses of the body 9. The control unit 5 is programmed to control the dental preparation by the robotic system 10. The latter comprises a mobile robotic arm 6 having an end 61 (the term "end" may underlie "end effector" in this document) to which is fixed a machining tool 7 adapted to the tooth 91 preparation, as it can be seen in more details in FIG. 5 hereafter described. The control unit 5 is further connected to the robotic arm 6 and/or to the tool 7 via the robotic arm 6, so that to order robotic arm 6 movements according to base axis associated to three base translations and three base rotations, and to operate the tool 7. The control unit 5 is able to control the robotic arm 6 so that to perform the dental preparation by means of the tool 7. This is effectively realized as the control unit 5 is configured to read a beforehand prepared computer file (e.g. computer program (product)) comprising instructions associated to representation data of the body 9 (i.e. the dentition) for performing the dental preparation by means of the tool 7.

In particular, a machining instruction is associated to a representation data of the tooth 91, so that to be implemented at a right point on the tooth 91. Pose calibration data of the tool 7 are known by the control unit 8, e.g. registered on it, so that the control unit may associate robotic arm movements to updated pose of the tool 7 so that to run the instruction on the tooth 91 for a theoretical stable pose of the body 9 corresponding to the data representation. However, as the body 9 (and more generally the patient) may move, the control unit 5 has to take into account the body 9 movements for running the instructions, so that to compensate the body 9 movements. This is made possible thanks to the tracking system 1 having the computing unit 4 monitoring and sending to the control unit 5 updated body 9 pose as explained in the disclosure. For instance, the computing 4 or the control 5 units may compute a body 9 pose variation per unit of time so that to that to adapt the tool 7 pose of the same thanks to robotic arm 6 movements ordered by the control unit 5. The embodiment described allows for a dental preparation with a final cutting precision below 50 μm, which is highly below known robotic system of the art. Another advantage of this embodiment is that the cutting time for one tooth is further reduced to about 6 minutes which is also unmet in the prior art.

As represented on FIG. 1, the spatial reference frame 3 comprises a support part 32 designed to be placed on the body 9. The support part 32 includes a coupler 33 configured to demountably couple the target 31 to the support part so that the target 31 can be reused for several dental preparations, while the support part 32 is single-use. In this spirit, the support part 32 conforms to a shape teeth of the body 9 on which is attached the spatial reference frame 3. This allows to increase the stability of the attachment of the spatial reference frame 3 to the body for such dental preparation. Such a support 32 can be made from an intra-oral three-dimensional representation of the body 9, more preferably by means of an intra-oral scanner, using then the same data as the one needed to prepare the computer file above commented in more details in the description of the document EP3639787A1 and US 2021/0369421 A1.

Figure 2:
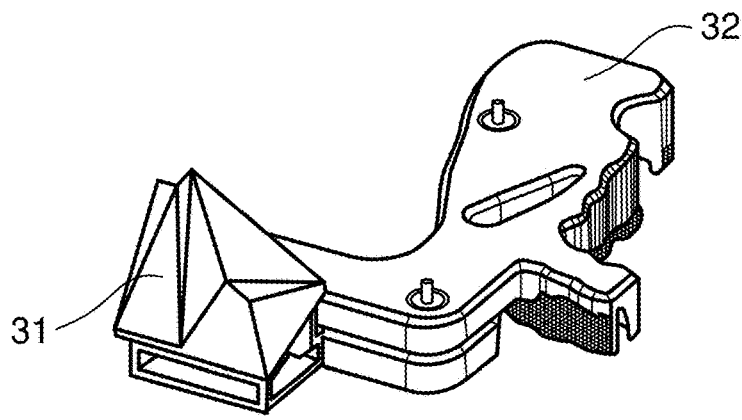
FIG. 2 illustrates a spatial reference frame of a tracking system for tracking movements of a dentition according to an embodiment of the disclosure.

Although the coupler 33 is illustrated as a clipping means on FIG. 1, this is not limiting in any way. In addition, the removable feature of the coupler 33 is optional and it can generically be considered a support part 32 non-removably fixed to the target 31 in framework of the disclosure. FIG. 2 illustrates an embodiment of a spatial reference frame 3 very specifically adapted to dental preparation. In particular the target 31 geometry was designed by using a computer-implemented method of step (i) to (v) as shown in FIG. 4 and described in the disclosure of the disclosure. The drawing of the target 31 is to be considered as a disclosure of all geometrical features directly readable on the FIG. 2. The target 31 is subscribed in a cube of about 14 mm edges and designed to be placed at about 10 cm of the laser device 2 as shown on FIG. 1. The laser device 2 has a resolution so that sensing laser profiles of 2048 points.

An example of a base geometry 8 obtained from step (ii) of the computer-implemented method for designing the target 31 is shown on FIG. 4. The base geometry 8 still comprises faces 82 of the cubic base of step (i) that were not affected by the modification of points 81 positions induced by step (ii). The points 81 can be randomly generated depending on movements and body 9 to be tracked and on operating conditions for the robotic system 10. In the base geometry 8 shown, one of the points 81 is at the middle of an edge of the original cubic base, while the others are at some vertices (or corners) of the latter. As illustrated beside the base geometry 8, a sample of possible poses of the base geometry is then set at step (iii) by movements according to six bases axis as mentioned above, so that to compare sensed laser profiles 24' corresponding to each of these poses and infinitesimal changes of it at step (iv). The points 81 positions are then modified again at step (v) so that to increase iteratively in average the difference between the sensed laser profiles 24' and to converge to the target 31 geometry as explained above in the disclosure of the disclosure.

Figure 3:
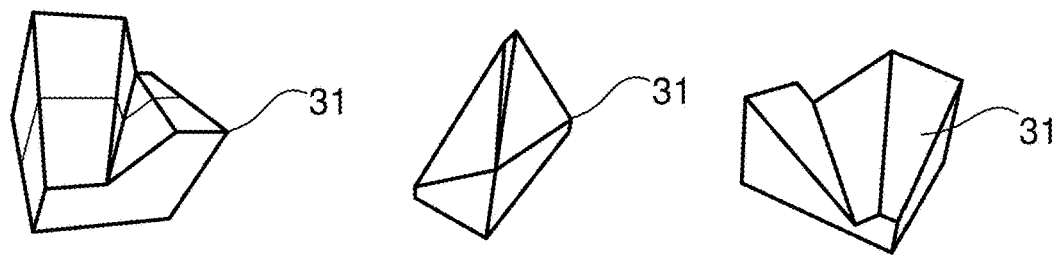
FIG. 3 illustrates examples of targets for a spatial reference frame of a tracking system according to according to embodiments of the disclosure.

FIG. 3 illustrates examples of targets 31 obtained from this method according to appropriate geometric parameters of the geometry for medical operations. As the skilled person would understand, the target 31 is then optimized case by case based on the above method depending on body 9 movements to be tracked and operating conditions for the robotic system 10.

Figure 5:
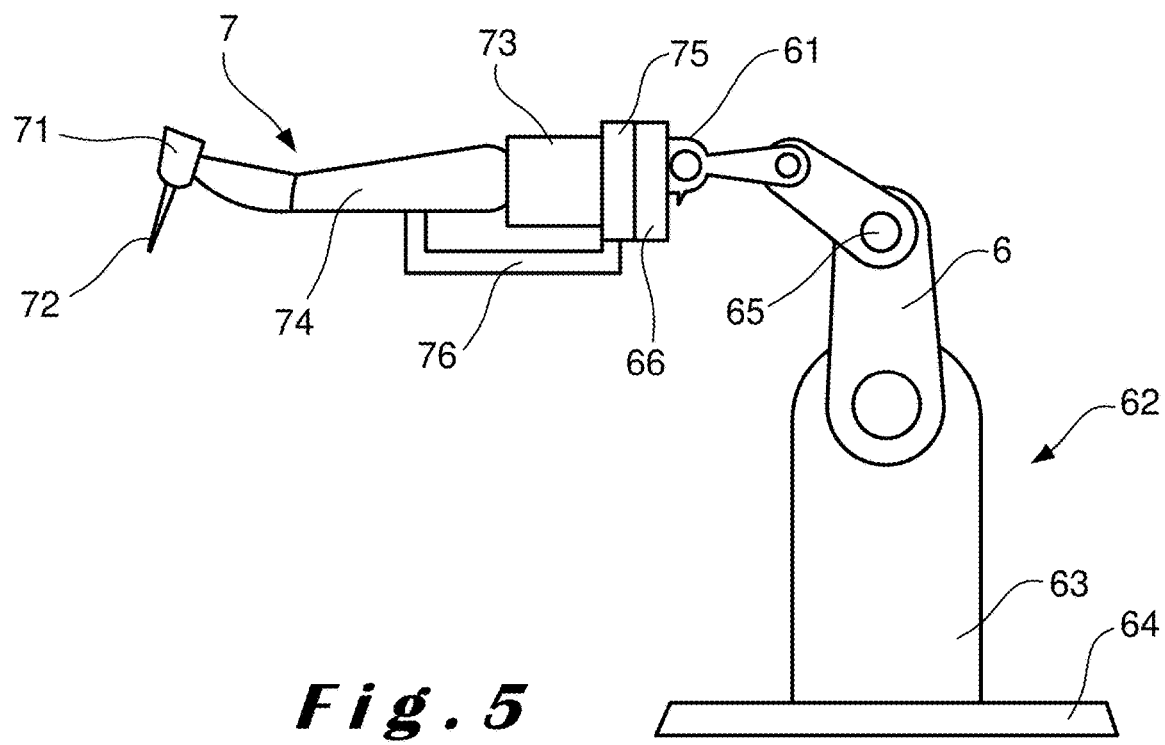
FIG. 5 illustrates a robotic arm holding an operation tool as part of a robotic system according to an embodiment of the disclosure.

A more global view of the robotic arm 6 maintaining a tool 7 is shown on FIG. 5 for a dental preparation as shown on FIG. 1. The robotic arm 6 is mounted on a massive supporting base 62 having a column 63 mounted on an extended ground support platform 64. Although not illustrated, the latter can be endowed with wheels or any displacement means, or only a massive platform all along in contact with ground. The supporting base 62 is designed to be sufficiently massive to prevent vibrations from affecting the robotic arm 6, which could compromise the precision of the robotic system 10 and render pose calibration data outdated. For instance, based on the therapeutic requirements and the specifications of robotic system's kinematics calculations, the supporting base 62 typically weighs between 100 and 200 kg to ensure great stability during dental preparation and/or implants operations.

The robotic arm 6 is segmented with several bearings 65 allowing for movements according to the base axis as described above. The tool 7 is fixed at the end 61 of the robotic arm 6 by means of a pneumatic gripper 66. The tool 7 comprises a motor 73 connected to the control unit 5 by the robotic arm 6 and a force sensor 75 is arranged at the tool 7 level. The tool 7 also comprised a drill head 71 and a bur 72 powered by the motor 75 as known from the art. The force sensor 75 can sense force and/or pressure exerted at the bur 72 level and it is connected to the control unit 5, so that the latter can control the tool 7, and more specifically the drill head 71 and/or the bur 72 on basis of force and/or pressure data received from the force sensor. The pneumatic gripper 66 is also operable by the control unit 5 on the basis of the force and/or pressure data, to stop the tool 7 and/or to release the tool 7 from the end 61 of the robotic arm 6 if the force and/or pressure data exceed an upper threshold. For such a tool a limited force and/or pressure data also ensure that the machined tooth 91 is not subject to too high temperature, e.g. 40° C. or above, that can affect the tooth and/or bone vitality.

The skilled person will understand that the above description applies similarly to dental implant placement. In this case, the tooth 91 is replaced by a missing tooth in the dentition 9 and the bur 72 by an implant drill. The tool 7 has a contra-angle and/or surgical hand piece 74 for operator hand gripping and appropriate orientation. In particular, the robotic arm 6 and the tool 7 are made to reproduce the operator "Clinician's/Surgeon's" proprioception and to keep the robotic system 10 as a collaborative robot and/or cobot at a safe and human level. A holder 76 can be incorporated on the tool 7 so that to hold a target of another tracking system according to the disclosure (not illustrated) so that to track the tool 7 movements and to control that the tool 7 pose computed from this other tracking system correspond to the expected tool 7 pose deducted from the instructions.

In brief, the described disclosure relates to a dynamical high precision tracking system 1, notably for medical use, and to a robotic system 10 having a mobile robotic arm 6 holding a tool 7 for performing an operation on a body 9 taking advantage of the tracking system 1. The latter comprises an asymmetric polyhedric target 31 scanned by a laser device 2 so that to determine a pose of the body 9 based on a sensed laser profile 94' induced by the target 31.

To conclude, the disclosure of the introduced tracking 1 and robotic 10 systems directly addresses the prior art general issues by introducing a precise, automated approach to tooth preparation and alignment. Unlike manual systems and methods, the robotic system 10 is able to ensure a real-time compensation for dynamic patient movements in six base axis simultaneously and guarantees consistent, high-quality preparation independent of clinician or technician variability. This innovation reduces invasiveness, minimizes errors, and delivers a predictable, efficient, and high-precision treatment process, redefining standards in dental care and could be beneficial for all other medical or industrial application in focus terms of the core disclosure "Dynamic real-time tracking and robotic systems". It will be obvious to the person skilled in the art that the disclosure is not limited to the embodiment illustrated and/or described above, but that its scope is more broadly defined by the claims that are hereinafter introduced.

Certain embodiments disclosed herein utilize circuitry (e.g., one or more circuits) in order to implement standards, protocols, methodologies or technologies disclosed herein, operably couple two or more components, generate information, process information, analyze information, filter signals, generate signals, encode/decode signals, convert signals, transmit and/or receive signals, control other devices, etc. Circuitry of any type can be used. It will be appreciated that the term "information" can be use synonymously with the term "signals" in this paragraph.

In an embodiment, circuitry includes, among other things, one or more computing devices such as a processor (e.g., a microprocessor), a central processing unit (CPU), a digital signal processor (DSP), an application-specific integrated circuit (ASIC), a field-programmable gate array (FPGA), a system on a chip (SoC), or the like, or any combinations thereof, and can include discrete digital or analog circuit elements or electronics, or combinations thereof. In an embodiment, circuitry includes hardware circuit implementations (e.g., implementations in analog circuitry, implementations in digital circuitry, and the like, and combinations thereof).

In an embodiment, circuitry includes combinations of circuits and computer program products having software or firmware instructions stored on one or more computer readable memories that work together to cause a device to perform one or more protocols, methodologies or technologies described herein. In an embodiment, circuitry includes circuits, such as, for example, microprocessors or portions of microprocessor that require software, firmware, and the like for operation. In an embodiment, circuitry includes one or more processors or portions thereof and accompanying software, firmware, hardware, and the like.

In some examples, the functionality described herein can be implemented by special purpose hardware-based computer systems or circuits, etc., or combinations of special purpose hardware and computer instructions.

In the foregoing description, specific details are set forth to provide a thorough understanding of representative embodiments of the present disclosure. It will be apparent to one skilled in the art, however, that the embodiments disclosed herein may be practiced without embodying all of the specific details. In some instances, well-known process steps have not been described in detail in order not to unnecessarily obscure various aspects of the present disclosure. Further, it will be appreciated that embodiments of the present disclosure may employ any combination of features described herein.

The present application may reference quantities and numbers. Unless specifically stated, such quantities and numbers are not to be considered restrictive, but exemplary of the possible quantities or numbers associated with the present application. Also, in this regard, the present application may use the term "plurality" to reference a quantity or number. In this regard, the term "plurality" is meant to be any number that is more than one, for example, two, three, four, five, etc. The term "about," "approximately," etc., means plus or minus 5% of the stated value.

It should be noted that for purposes of this disclosure, the use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings.

Throughout this specification, terms of art may be used. These terms are to take on their ordinary meaning in the art from which they come, unless specifically defined herein or the context of their use would clearly suggest otherwise.

The principles, representative embodiments, and modes of operation of the present disclosure have been described in the foregoing description. However, aspects of the present disclosure, which are intended to be protected, are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure as claimed.

While illustrative embodiments have been illustrated and described, it will be appreciated that various changes can be made therein without departing from the spirit and scope of the invention.

The embodiments of the invention in which an exclusive property or privilege is claimed are defined as follows:

1. A tracking system for tracking movements of a body, comprising:
    a spatial reference frame comprising an asymmetric polyhedric target configured to be outwardly attached to the body;
    a laser device comprising a laser line emitter and a laser profile sensor configured to receive an emitted laser line reflection on the target; and
    a computing unit connected to the laser profile sensor and configured to determine a pose of the body based on a sensed laser profile.

2. The tracking system according to claim 1, wherein the spatial reference frame further comprises a support part designed to be placed on the body, the support part comprising a coupler configured to demountably couple the target to the support.

3. The tracking system according to claim 1, wherein the target has a geometry without undercut so that each sensed laser profile corresponds to a unique pose of the target with respect to the emitted laser line.

4. A method of manufacturing the tracking system according to claim 3, comprising the step of designing the geometry of the target by a computer-implemented method, the computer-implemented method comprising the following steps:
    (i) setting a cubic base and a selection of points on the cubic base;
    (ii) defining a base geometry by modifying a position of the points according to geometric parameters of the geometry;
    (iii) setting a sample of possible poses of the base geometry;
    (iv) for each pose of the sample, evaluating a distance between:
        a sensed laser profile corresponding to the pose, and
        a sensed laser profile corresponding to an infinitesimal change of the pose; and
    (v) iteratively modifying the position of the points to increase an average of the distances evaluated at the step (iv) and to converge to the geometry;
    the target being manufactured so that to reproduced the geometry obtained at step (v).

5. The method of manufacturing according to claim 4, wherein step (ii) of defining a base geometry by modifying a position of the points according to geometric parameters of the geometry depends on the laser device and/or on the movements to be tracked.

6. A tracking method for tracking movements of a body, comprising the following steps:
   providing a tracking system according to claim 1;
   attaching the spatial reference frame to the body so that the target is outward with respect to the body;
   placing the laser device so that the emitted laser line intersects the target and provides a reflection received by the laser profile sensor; and
   determining a pose of the body by a computer implemented method executed by the computing unit and comprising the following steps:
   (a) setting a pose guess of the target in a laser coordinate system and geometric parameters for faces of the target;
   (b) assigning each point of the sensed laser profile to one of said faces of the target based on the pose guess;
   (c) for each of said faces of the target, running a linear regression on points of the laser profile assigned to the face;
   (d) iteratively modifying the faces so that to decrease the difference between the faces geometric parameters of the linear regressions run at the step (c) and the faces geometric parameters of possible poses of the target, and to converge to a pose of the target; and
   (e) determining the pose of the body based on the pose of the target.

7. The tracking method according to claim 6, wherein the pose guess is set as a calibrated rest pose of the target or a preceding known pose of the target according to a frequency of the laser line emitter if any.

8. A robotic system for performing an operation on a body, comprising:
   a tracking system according to claim 1 for tracking movements of the body;
   a mobile robotic arm mounted on a supporting base and comprising an end to which is fixed a tool adapted to said operation; and
   a control unit connected to the robotic arm and to the computing unit of the tracking system, the control unit being configured to:
      read a computer file comprising instructions associated to body representation data for performing the operation on the body by means of the tool; and
      control movements of the robotic arm for running the instructions on basis a of pose calibration data of the tool and the pose of the body determined by the computing unit, so as to compensate the movements of the body in a coordinate system of the robotic arm.

9. The robotic system according to claim 8, wherein the pose calibration data of the tool are determined on basis of:
   emitted laser line reflections on the tool received by the laser profile sensor and processed by the computing unit; and/or
   comparison data between the body representation data and physical contact data between the tool and the body.

10. The robotic system according to claim 8, wherein the tool is removably fixed to the end of the robotic arm by a pneumatic gripper operable manually and/or by the control unit to which the pneumatic gripper is electromechanically coupled.

11. The robotic system according to claim 8, wherein the tool is endowed with a force and/or pressure sensor connected to the control unit, the latter being configured to control the tool on basis of force and/or pressure data received from the force and/or pressure sensor.

12. The robotic system according to claim 11, wherein the tool is removably fixed to the end of the robotic arm by a pneumatic gripper operable manually and/or by the control unit to which the pneumatic gripper is electromechanically coupled, and wherein the pneumatic gripper is operable by the control unit on the basis of the force and/or pressure data, so that to be configured to stop the tool and/or to release the tool from the end of the robotic arm if the force and/or pressure data exceed an upper threshold.

13. The robotic system according to claim 11 wherein the pose calibration data of the tool are determined on basis of comparison data between the body representation data and physical contact data between the tool and the body, and wherein the physical contact data correspond to poses of the tool in a coordinate system of the robotic arm when force and/or pressure data reach a lower threshold.

14. The robotic system according to claim 8, wherein the supporting base comprises a column mounted on an extended ground support platform, both being more massive than the robotic arm.

15. A robotic system for performing an operation on a body, comprising:
   first and second tracking systems according to claim 1, the first tracking system being configured to track movements of the body;
   a mobile robotic arm mounted on a supporting base and comprising an end to which is fixed a tool adapted to said operation; and
   a control unit connected to the robotic arm and to the computing unit of the first tracking system, the control unit being configured to:
      read a computer file comprising instructions associated to body representation data for performing the operation on the body by means of the tool; and
      control movements of the robotic arm for running the instructions on basis a of pose calibration data of the tool and the pose of the body determined by the computing unit, so as to compensate the movements of the body in a coordinate system of the robotic arm,
   wherein the spatial reference frame of the second tracking system is attached to the tool, and the control unit is connected to the computing unit of the second tracking system and configured to control the robotic arm based on a real-time comparison of an expected pose of the tool derived from the instructions with a pose of the tool determined by the computing unit of the second tracking system.

16. The robotic system according to claim 15, wherein the tool is removably fixed to the end of the robotic arm by a pneumatic gripper operable manually and/or by the control unit to which the pneumatic gripper is electromechanically coupled, and wherein the pneumatic gripper is operable by the control unit on the basis of the real-time comparison, so that to be configured to stop the tool and/or to release the tool from the end of the robotic arm if said pose of the tool and said expected pose of the tool does not match.

* * * * *